US009421578B2

(12) United States Patent
Sickinger et al.

(10) Patent No.: US 9,421,578 B2
(45) Date of Patent: Aug. 23, 2016

(54) SEPARATION DEVICE FOR A PRODUCT STREAM AND PROCESS THEREFORE

(71) Applicant: MULTIPOND Wägetechnik GmbH, Waldkraiburg (DE)

(72) Inventors: Günther Sickinger, Ampfing (DE); Andreas Peters, Aschau am Inn (DE)

(73) Assignee: MULTIPOND WÄGETECHNIK GMBH, Waldkraiburg (DE)

( * ) Notice: Subject to any disclaimer, the term of this patent is extended or adjusted under 35 U.S.C. 154(b) by 0 days.

(21) Appl. No.: 14/575,158

(22) Filed: Dec. 18, 2014

(65) Prior Publication Data

US 2015/0174617 A1   Jun. 25, 2015

(30) Foreign Application Priority Data

Dec. 19, 2013   (EP) ..................................... 13198617

(51) Int. Cl.
| | | |
|---|---|---|
| *B07C 5/36* | (2006.01) | |
| *B07B 11/06* | (2006.01) | |
| *B07B 13/16* | (2006.01) | |
| *B07B 11/04* | (2006.01) | |
| *G01G 19/387* | (2006.01) | |
| *G01G 13/02* | (2006.01) | |

(52) U.S. Cl.
CPC .................. *B07B 11/06* (2013.01); *B07B 11/04* (2013.01); *B07B 13/16* (2013.01); *G01G 19/387* (2013.01); *G01G 13/022* (2013.01)

(58) Field of Classification Search
CPC ........ B07B 11/04; B07B 11/06; B07B 13/16; G01G 19/022; G01G 19/387

USPC ......................................................... 209/606
See application file for complete search history.

(56) References Cited

U.S. PATENT DOCUMENTS

| | | | |
|---|---|---|---|
| 4,431,530 A | 2/1984 | syben | |
| 5,074,435 A | 12/1991 | Suverkrop et al. | |
| 5,962,816 A * | 10/1999 | Zeyer ................... | G01G 19/393 177/25.18 |
| 2015/0068869 A1 * | 3/2015 | Hammacher ........... | B65B 23/14 198/459.6 |

FOREIGN PATENT DOCUMENTS

DE   19617982 A1   11/1997

OTHER PUBLICATIONS

Extended European Search Report dated Jun. 26, 2014 for the Corresponding European Patent Application No. 13198617.6.

* cited by examiner

*Primary Examiner* — Terrell Matthews
(74) *Attorney, Agent, or Firm* — Hassan Abbas Shakir; Katten Muchin Rosenman LLP

(57) ABSTRACT

A separation device according to the invention has a separation means, for separating one part of a product stream, and at least one separation groove for transporting the separated product stream. Further, a reservoir is provided, wherein the separation groove is arranged in a way, that the separate product stream is transferrable into the reservoir. The reservoir is thereby formed in a way that the product stream can be transported, which is supplied from the separation groove into the reservoir.

20 Claims, 4 Drawing Sheets

SEPARATION DEVICE FOR A PRODUCT STREAM AND PROCESS THEREFORE

BACKGROUND OF THE INVENTION

1. Field of the Invention

Figure 1:
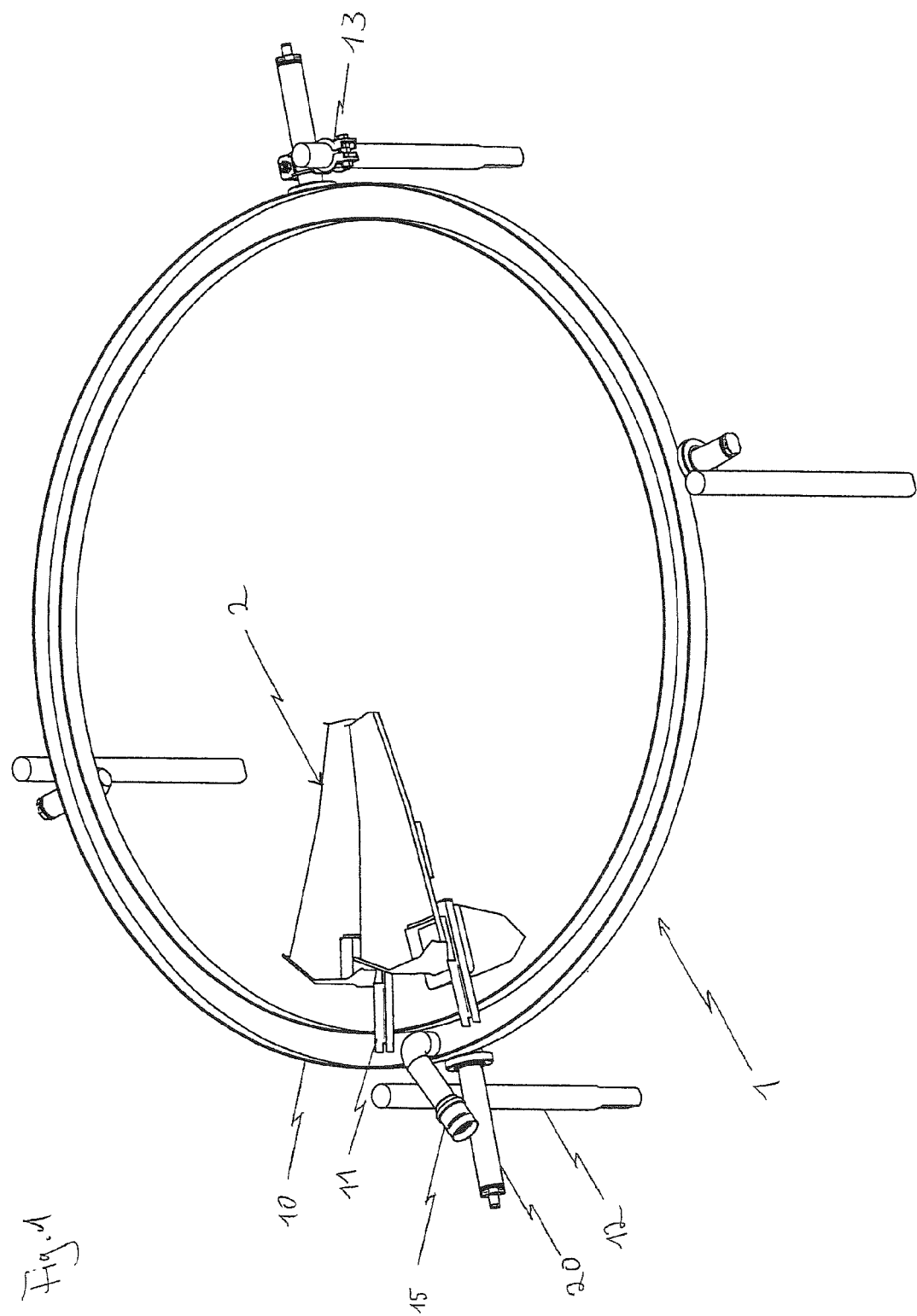

The invention relates to a separation device for a product stream and a method for separating at least part of a product stream.

2. Description of the Related Art

The handling of products in installation engineering, especially with a proceeding automatization, also requires to process and transport products, which have a certain share of slack. The source for such slack can lie, for example, in the products per se. This can occur, if products are damaged, break, crumble or fall apart, like it is conceivable in the case of baking goods.

Furthermore, slack can be produced, if foreign shares are contained in the products stream. These foreign shares can be desired components, like, for example, sugar, salt, pepper, chocolate pellets or similar components, provided for the decoration or coating of the products. It is, however, also conceivable, that undesired components are involved, like, for example, dust, sand ice crystals, liquids or the like.

By the presence of slack in the stream of transported products, the processing or the transport thereof can get difficult. In this case, for example friction forces and adhesion forces can occur, which disturb the machines, or which disturb the determined processing of the products, or can in turn lead to their damage or destruction.

Further, damaged products or foreign shares of other components are undesired, as a pure processing is usually desired and the product should be handled in whole pieces. Further, problems can arise during a weighing and packaging process, if slack is transported together with the products.

Therefore, separation devices for slack of different nature are used, for example during the production and processing of construction materials, food, combustible material, etc. Thereby, the products which contain slack are led, for example, over sieves or are blown with air, to remove small-pieced shares, or to remove dust or the like.

A too high share of liquid or ice crystals could, for example also negatively influence the guaranteed minimum share of a solid, frosted product in a finished package. Furthermore, product shares captured in the sealing jaws of a packaging machine could prohibit the tight closing of the package and could lead to a machine disturbance.

In some industries it is desired to use the slack removed from the product stream, by leading it to other product categories or by recycling it in the same process.

Like that, there are devices known in the food industry, which separate a loose sugar share from a product stream of sugared sweet food over slits in the transport path and lead it via pipes into reservoirs. Thereby, the pipes must preferably not block the access to the further parts of the plant.

It is a disadvantage of those known devices that they represent closed systems due to the normally used pipes, which cannot be looked into. This entails the further disadvantage that those systems are difficult to clean. This is not desirable due to hygienic reasons.

Furthermore, in the known systems the slack is filled into containers. These containers have to be monitored respectively, and if necessary, they have to be emptied or changed. This requires a manual intervention and causes an interruption, which does not enable a reliable discharge of the sugar, until the emptied or a new container is provided.

Thereby there are further concerns, whether the sugar separated in this way can or should really be reused.

It is therefore an object of the present invention to provide an improved separation device, which at least clears one of the above-mentioned disadvantages.

SUMMARY OF THE INVENTION

The object is solved with a separation device with
- a separation means, for separating a part of a product stream,
- at least one separation groove for the transport of the separated product stream, and
- a reservoir,
- wherein the separation groove is arranged in a way, that the separated product stream is transferrable into the reservoir, characterized in that
- the reservoir is formed to transport the product stream which is supplied from the separation groove into the reservoir.

The object is solved with a weighing device, in particular combination weighing device.

According to a first aspect of the present invention, a separation device is provided, which comprises a separation means for separating a part of a product stream. This separation device has further at least one separation groove for the transport of the separated product stream, and a reservoir. Thereby, the separation groove is arranged in a way that the separated product stream is transferrable into the reservoir. That means, the separation groove leads the separated product stream into the reservoir. The reservoir is formed in a way that it can continue transporting the separated product stream, that means, the product stream fed to the reservoir. The product stream which is not separated is thereby continuously transported independently from the separation device. In some embodiments, the separated product stream is especially slack.

In some embodiments the separation device is upstream to a weighing unit, for example a weighing cell in a combination weighing device. In this way it can be prevented that the separated product stream, therefore especially slack, can get into the weighing cell and is also weighed. This can improve the reliability of the device.

The reservoir is opened towards the separation groove at least in the area, in which a feeding of the separated product stream from the separation groove occurs. In certain embodiments, especially also the whole reservoir can be open. Therefore, the reservoir can be formed in the form of a U profile, so that a feeding of the separated product stream is possible at each position of the reservoir.

The separated product stream can thereby, for example, slide on the separation groove away from the separation device. It is, however, also conceivable, for example during the transport of larger or whole product parts, that the separation groove comprises an own transport means for the transport of the separated product stream.

In this way a continuous feed of the separated product stream, for example sugar, can be enabled. By the further transport, also an exploitation of the separated product stream can be enabled. This can lower production costs. Further, this can increase a productivity of the plant.

In specific developments of the application, the reservoir can be formed as a rotatable collection ring. Such a collection ring can be formed rotatably around a vertical axis. In this way, the same reservoir can be supplied with slack from several separation devices, wherein this slack can be further transported by each of the separation devices. Further, a simplified removal of the slack can be obtained. This can save production costs by the increase of the recyclable share.

In further embodiments it is also possible that the reservoir is provided with a separate transport means. In this way, the reservoir can for example comprise a movable transport band or the like, by which the separated product stream is transported in the reservoir.

In further developments of the invention the separation groove and/or the reservoir can comprise a predetermined bottom geometry. This bottom geometry can for example be a surface roughness. The bottom geometry can also comprise certain forms, like longitudinal or transverse bracings. Furthermore, it is conceivable that the bottom geometry comprises knobs, stoppers or similar components known by the person skilled in the art. Furthermore it is conceivable that the bottom geometry is influenced by certain material properties, for example low adhesion forces or high adhesion forces. It is clear that the bottom geometries of the separation groove and of the reservoir can differ from each other.

In this way, the invention can be adapted to very different applications and can be used for very different types of slack.

In further certain developments of the invention, the separation device comprises at least one drive unit for driving the reservoir, especially the transport means of the reservoir. In this way, a removal of the separated product stream can be automatized. This can enable an improved productivity of the device. Further, this can enable a continuous removal of the slack. It is thereby, however, also conceivable that the removal can be adapted to the respective amount of slack to be removed. The removal can thereby be especially automatized.

Preferably, the drive unit can be an electric motor. In certain developments, this drive unit can also be a capsuled drive motor. In certain developments, the drive unit can preferably be a dust-proof capsuled drive motor. In this way, a risk can be decreased that foreign shares on the part of the drive unit can get into the product stream or into the separated product stream. This can increase a reliability of the device.

In some embodiments, the motor can be a BLDC motor. A compact construction can thereby especially enable the installation into pipes. Such motors can comprise a drive roller for driving the reservoir.

In certain embodiments, the reservoir can further comprise a guiding means. The guiding means can allow a guiding means of the reservoir for the transport of the separated product stream. In this way, the reservoir can further transport the separated product stream reliably. This can allow an improved automatization. It is thereby especially also conceivable that the guiding means only guides the transport means of the reservoir.

In certain developments of the application, the guiding means can comprise rollers. The rollers can thereby be provided in a way that the reservoir or the transport means of the reservoir can be guided axially or radially. This can be enabled via a respective fixation, for example with universal joints, like to be described later. By such joints, the number of degrees of freedom at the support of the reservoir can be increased. In this way, the area of application of the separation device or the reservoir can be increased. In this way, an improved distribution of the separated product can be obtained.

In further developments of the invention, the guiding means can at least comprise one drivable roller. In this way, a guiding means and a driving unit of the reservoir and the transport means of the reservoir can be combined. This allows a reduction of the complexity of the device. This can thereby decrease the costs for the device.

Further, a holder can be provided in certain developments, which at least comprises one universal joint for the fixation of the separation device. By providing a holder, a fixation of the device according to the invention at a multiplicity of different industrial plants can be enabled. By providing a universal joint, the fixation can be further made easier. Further, an individual fixation of the device dependent on the industrial plant, the building space and further factors is possible.

In certain further embodiments, the separation device can comprise a capture means for capturing of parameters of the separated product stream. In this way, for example a detector can be provided, which captures an amount of separated product parts. It is further conceivable that a detector is provided, which captures the size of the elements of the separated product stream. Further, it is conceivable that a detector captures the volume and/or the weight and similar parameters of the separated product stream. In this way, a control of the reservoir dependent on the respectively existing product stream can be provided.

Accordingly, the device according to the invention can in certain developments further comprise a control unit, for controlling and/or regulating of a movement, especially a rotational movement, of the reservoir dependent on predetermined parameters and/or parameters, which were captured with the capture means. The control can of course also only exclusively control the transport means of the control device. Especially, the movement can be the transport movement of the reservoir.

Furthermore it is conceivable that also the separation groove comprises a transport means, which is controlled by the control means. In this way, especially a transport velocity of the separate product stream can be adapted to the amount of the separated product stream. For example, at a higher share to be separated, a higher velocity of the transport in the separation groove and/or the reservoir can be desired. At respectively smaller amounts, a respective lower velocity can be desired. In this way, an improved automatization can be enabled via a respective control. Further, energy for the transport of the separated product stream can be saved.

In certain developments, the separation means can further comprise a suction hole. The suction hole can thereby be formed in a way that at least a part of the separated product stream collected in the reservoir can be sucked off the reservoir.

Hereto, the suction device can for example also comprise a suction nozzle. The suction nozzle or the suction hole can for example comprise a predetermined diameter. In this way, only parts with a predetermined size can be sucked off. Further, the suction nozzle or the suction hole can provide means, for example webs or grids or the like. In this way, in turn a size of particles can be limited, which should be sucked off by the suction device.

Further, the suction performance of the suction device can be regulable. Thereto, the suction device can be controlled for example by a control device, for example by the above-mentioned control device. In this way a weight, especially a maximum weight, of the particles, which should be sucked off by the suction device from the reservoir, can be predetermined or changed.

In further developments, the separation device can further comprise a multiplicity of reservoirs, which are aligned in series, preferably below each other, in transport direction of the separated product stream. Thereby at least one of the reservoirs can comprise a selection means for selecting a part of the separated product stream. This selection means can for example be a grid, a sieve, a web or the like. The selection means can thereby be provided in a way that, similarly to a sieve, a part of the separated product stream, in the case of a sieve those parts of the product, which fit through the sieve, can be transferred to a further reservoir. This transferred part can be the selected part or just the not-selected part.

Of course, further selection means are conceivable, which allow a selection due to different properties. In this way, product parts can comprise different physical properties like weight, density, melting point, freezing point or magnetic properties which delimit them from other product parts. Respective selection means can in so far comprise weighing units, liquids with predetermined densities or other features, heating devices, cooling devices, magnets or the similar.

It is further clear that all of the mentioned embodiments and developments are combinable with each other. In the present case, for reasons of clarity, it is omitted to show each of the possible combinations separately.

According to a second aspect of the invention, a weighing unit is provided, especially a combination scale, which comprises a separation device according to one of the embodiments of the first aspect. In this way, undesired slack can be reliably removed while weighing in of the products. This can increase a reliability and preciseness of a filling plant.

According a third aspect of the invention, a method is provided for separating a part of the product stream. The method includes the steps of separating of a product stream with a separation means; transporting the separated product stream by means of a separation groove; transferring the separated product stream from the separation groove into a reservoir; and the transporting of the product stream supplied in the reservoir from the separation groove.

BRIEF DESCRIPTION OF THE INVENTION

Further advantages, developments and preferred embodiments of the invention will be described in the following with reference to the figures more in detail.

Figure 2:
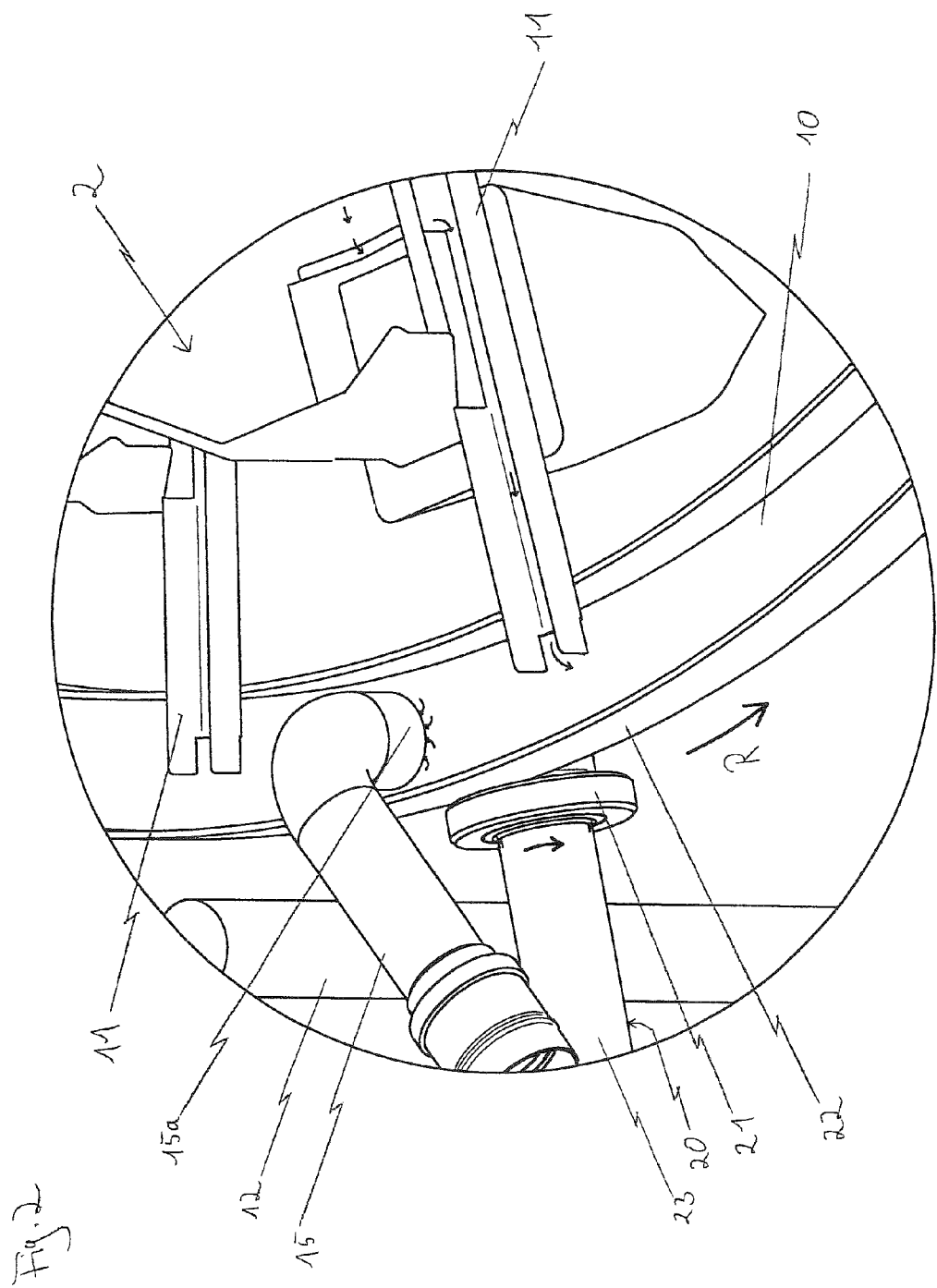
Figure 3:
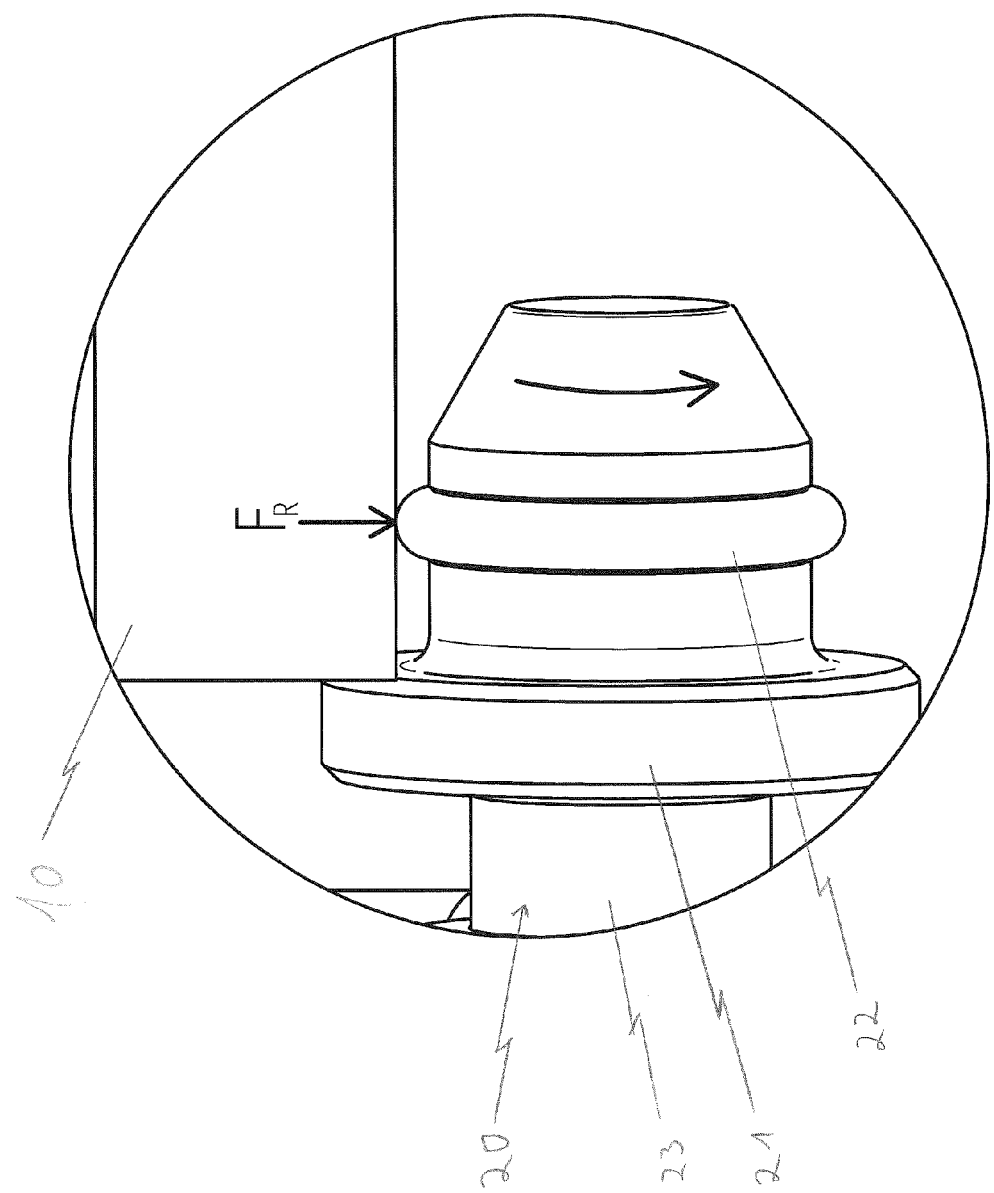
Figure 4:
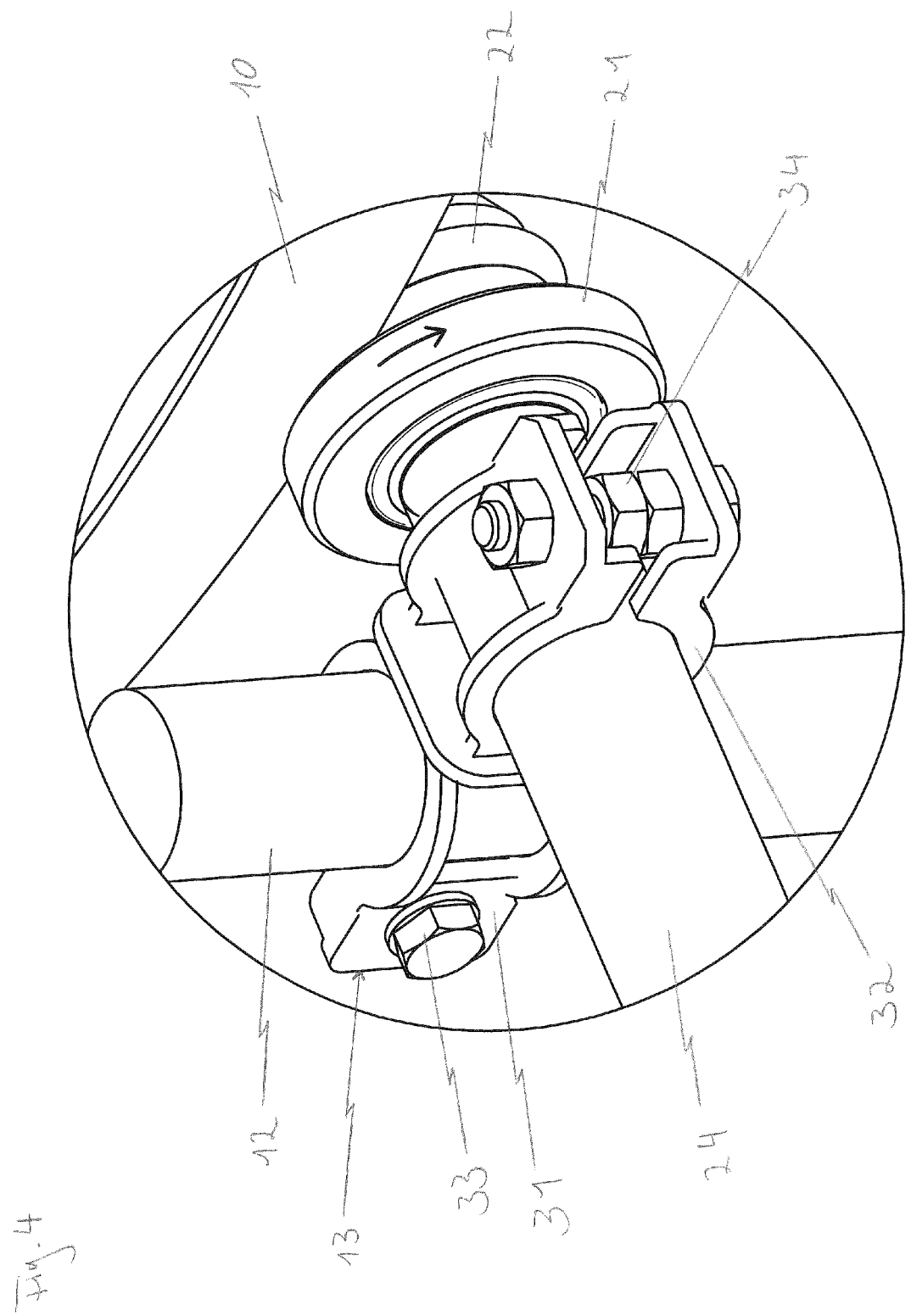

Thereby shows:

FIG. 1 a separation device according to one embodiment;

FIG. 2 an enlarged representation of a cutout of FIG. 1;

FIG. 3 a guiding and driving means of a separation device according to one embodiment;

FIG. 4 a fixation device of a separation device according to one embodiment.

DETAILED DESCRIPTION OF THE INVENTION

FIG. 1 shows a separation device 1 according to an embodiment of the present invention. The separation device 1 comprises a ring-shaped reservoir 10. The reservoir 10 is aligned around a separation device 2. The separation device 2 serves for separating a part of a product stream supplied to it and for further processing of the not-separated part of the product stream. A separation of the product stream is performed in the normal manner and is not described in detail here.

The separation device 1 further comprises a multiplicity of separation grooves 11. The separation grooves 11 respectively substantially extend in a radial direction from the direction of the center of the reservoir 10 from the separation device 2 towards the reservoir 10. In the present case, the separation grooves 11 are formed in a U-shape. An open side of the separation grooves 11 is thereby opened towards an opening of the separation device 1. In this way, the separated product stream can get from the separation device 2 into the separation device 11.

Furthermore, the separation groove 11 has an open end on the front side. This open end of the separation groove 11 projects over an opening of the reservoir 10. In this way, the product stream located in the separation groove 11 can be transferred from the separation groove 11 into the reservoir 10.

In certain embodiments of the invention, the separation groove 11 is inclined downwards from the separation device 2 in the direction of the reservoir 10. In other embodiments, also a vibration means can be provided, so that at least the separation groove, optionally also the reservoir and/or the separation device can be put into vibration. In this way, a transport of the separated product stream can be improved.

It is clear that in FIG. 1 only a part of the conceivable separation device is presented. In particular, it is conceivable that a multiplicity of separation devices 2 in a circumferential direction of the reservoir are formed. Thereby, preferably each of the separation devices 2 comprises a separation groove 11.

The separation device 1 shown in FIG. 1 further comprises the multiplicity of feet 12. The feet 12 are formed in a cylindrical shape. The feet 12 are arranged in a circumferential direction of the reservoir 10 in continuous distances.

At an upper final section of the feet 12, that means on a side of the feet 12 averted to the floor, a fixation means 13 is provided, as will be described later in detail.

At the fixation means 13, a drive 20 is fixed. The drive 20 is thereby a cylindrically-shaped motor, which will be described later in detail as well.

Further, the separation device 15 comprises a suction device 15. As shown in FIG. 2, the suction device 15 is formed as a pipe, which extends in a horizontal direction over the reservoir 10. In one pipe section, which projects over the reservoir 10, the pipe comprises a curvature, which aligns the end of the pipe in the suction device 15 towards the reservoir. The suction device further comprises a suction nozzle 15a, which is arranged in a final section of the suction device 15.

As it is clear from FIG. 2, the drive unit 20 comprises a guiding means 21. The guiding means 21 is provided at one side of the drive unit 20, which is facing the reservoir 10. The guiding means 21 is cylindrically arranged around the drive unit 20 and extends from the drive unit 14 in a radial direction projecting outwards.

As it is clear from FIG. 3, the drive unit comprises a rotatable shaft 23. The guide device 21 and a drive means 22 are arranged on the shaft 23. The drive means 22 is arranged between the guiding means 21 and one end of the shaft 23. Thereby, the drive means 22 is arranged in a ring-shape around the shaft 23. Especially, the drive means can be formed as an O-ring, for example made of rubber.

The drive means 22 thereby extends in a radial direction relatively to the shaft 23 parallel to, but not as far as the guiding means 21. The guiding means 21 therefore projects over the drive means in the radial direction relative to the shaft, in the present embodiment therefore in a vertical direction.

A rotation of the shaft 23 thereby leads also to rotation of the guiding means 21 and the drive means 22, like indicated by the curved arrow in FIG. 3.

The feet 12 and the drive unit 20 are thereby arranged in a way that the reservoir 10 lies on the final section of the shaft 23, which is provided with the drive means 22. Further, the drive unit 20 is arranged in a way that the reservoir 12 is limited in a radial direction, that means at an outer circumferential side, from the guiding means 21. Preferably, the arrangement occurs in a way that the reservoir 10 and the guide device 21 are contact-free, to avoid a friction therebetween.

Further, the reservoir 10 at least partially lies on the drive means 22. The rotation of the shaft 23 in rotation direction therefore causes also a friction force $F_r$ between the reservoir 10 and the drive means 22, like obvious from FIG. 3. That leads to the fact that the rotation of the shaft 23 in a rotation direction causes a movement R of the reservoir, as indicated in FIG. 2 by the curved arrow.

In this way, the reservoir 10 is rotated, and the material contained in the connection device 10 can be transported past the suction device 15.

FIG. 4 shows a fixation of the drive unit 20 to a foot 12. The fixation of the drive unit 20 relatively to the foot 12 is performed in the present case via the fixation means 13. The fixation means 13 is formed as a universal joint. The fixation means 13 further comprises a first fixation sleeve 31. The first fixation sleeve 31 is arranged around a foot 12. With a first locking means, in this case a nut-screw combination 33, the first fixation sleeve 31 is fixed to the foot 12. In addition to the first fixation sleeve 31, a second fixation sleeve 32 is provided, which is rotatably arranged relative to the first fixation sleeve 31. In this way, any angle, in the present case 90°, can be adjusted between the first fixation sleeve 31 and the second fixation sleeve 32.

Analogous to the first locking means, also the second fixation sleeve 32 comprises a nut-screw combination 34 for fixation. The fixation sleeve 32 is thereby fixed to a sleeve 24, surrounding the shaft 23. In this way, the shaft 23 can rotate, wherein a secure holding of the drive unit 20 and also the reservoir 10 is enabled.

While in the shown embodiment in FIG. 1, a drive 20 is arranged at each foot 12, in different embodiments only one of the feet or part of the feet can comprise a drive unit. The feet not provided with a drive unit can comprise means for carrying the reservoir in this case. These means can be especially ball-bearings or the like.

In the following, the function of the present device should be shortly explained again on the example of a combination scale, to describe the present method. It is clear that an analogous application can also be found at different industrial plants.

A special embodiment of the present invention should discharge a loose sugar share from linear grooves for feeding of the products to a combination scale, which weights sugary products. Thereby it should be avoided that this loose sugar can get into the containers and subsequently into the packaging. Therefore, at the end of the linear grooves, separation grooves 11 are provided. Those lead the sugar, which falls out through one or several slid-shaped openings in the groove bottom of the linear grooves, via open grooves, for example via a respective inclination, to the reservoir 10, i.e. in this case to a collection ring. The separation grooves 11 are fixed to the linear grooves and can, preferably together with those, put into vibration, so that the sugar can migrate in the direction of the ring.

The ring consists of an open, ring-shaped channel, which lies on several bearing- and guide-rollers. The ring can be put into movement via one or more drive units in any rotational direction. As drive units, motors built into pipes are provided, which are preferably capsuled in a dust-proof manner. On the motor-shafts, led out via a shaft seal, drive rollers with guiding function are arranged, on which an O-ring is fixed. The ring lies with its own weight on this O-ring. During the rotation of the motor shaft, the ring is driven in one direction via the friction force between O-ring and ring bottom.

The guide-rollers and -drive units are universally and infinitely fixable via universal joints to all machine types. These, in turn, are fixed to the supporting arms of the frame. The extension of the separation device onto the present mechanical construction of a combination scale thus does not require fundamental changes thereof. The access to all components is still possible.

To sum up, a separation device 1 is described. The separation device has a separation means 2, for separating a part of the product stream, and at least one separation groove 11 for the transport of the separated product stream. Furthermore, a reservoir 10 is provided, wherein the separation groove 11 is arranged in a way that the separated product stream is transferrable into the reservoir 10. The reservoir 10 is thereby formed in a way that the product stream supplied from the separation groove 11 into the reservoir 10 can be transported.

What is claimed is:

1. A separation device comprising:
  a separation means for separating a part of a product stream into a separated product stream;
  at least one separation groove for the transport of the separated product stream, and
  a reservoir;
  wherein the separation groove is arranged in a way, that the separated product stream is transferrable into the reservoir;
  wherein the reservoir is formed to transport the product stream which is supplied from the separation groove into the reservoir;
  wherein the reservoir is a rotatable collection ring.

2. The separation device according to claim 1, wherein the separation groove or the reservoir comprises a predetermined bottom geometry.

3. The separation device according to claim 1, further comprising at least one drive unit (20) for driving the reservoir (10).

4. The separation device according to claim 3, wherein the drive unit is a dust-proof capsuled, drive motor.

5. The separation device according to claim 1, further comprising at least one guiding means.

6. The separation device according to claim 5, wherein the guiding means comprises rollers for axially or radially guiding the reservoir.

7. The separation device according to claim 5, wherein the guiding means comprises at least one drivable roller.

8. The separation device according to claim 1, further comprising a holder, the holder comprising at least one universal joint for fixing the separation device.

9. A separation device comprising:
  a separation means for separating a part of a product stream into a separated product stream;
  at least one separation groove for the transport of the separated product stream;
  a reservoir;
  a determination means for determining of parameters of the separated product stream; and
  a control means for regulating or controlling a movement, the movement being a rotation movement, of the reservoir, dependent on predetermined parameters or parameters determined with the determination means;
  wherein the separation groove is arranged in a way, that the separated product stream is transferrable into the reservoir;
  wherein the reservoir is formed to transport the product stream which is supplied from the separation groove into the reservoir.

10. The separation device according to claim 1, further comprising a suction device, wherein the suction device comprises a suction opening, the suction opening is formed in a way that at least one part of the product stream, separated and collected in the reservoir, can be sucked off the reservoir.

11. The separation device according to claim 1, wherein the separation device comprises a multiplicity of separation devices, which are arranged in a transport direction of the separate product streams in series, below each other, wherein at least one of the reservoirs comprises a selection means for selecting one part of the separated product stream, the selection means is formed in a way that the selected part or the non-selected part is transferrable into a further reservoir.

12. A combination weighing device comprising:
a separation device comprising
- a separation means for separating a part of a product stream into a separated product stream;
- at least one separation groove for the transport of the separated product stream, and
- a reservoir;
- wherein the separation groove is arranged in a way, that the separated product stream is transferrable into the reservoir;
- wherein the reservoir is formed to transport the product stream which is supplied from the separation groove into the reservoir;
- wherein the reservoir is a rotatable collection ring.

13. The combination weighing device according to claim 12, wherein the separation groove or the reservoir comprises a predetermined bottom geometry.

14. The combination weighing device according to claim 12, further comprising at least one drive unit for driving the reservoir.

15. The combination weighing device according to claim 14, wherein the drive unit is a dust-proof capsuled, drive motor.

16. A combination weighing device comprising:
a separation device comprising
- a separation means for separating a part of a product stream into a separated product stream;
- at least one separation groove for the transport of the separated product stream, and
- a reservoir;
at least one guiding means, wherein the guiding means comprises rollers for axially or radially guiding the reservoir,
wherein the separation groove is arranged in a way, that the separated product stream is transferrable into the reservoir;
- wherein the reservoir is formed to transport the product stream which is supplied from the separation groove into the reservoir.

17. The combination weighing device according to claim 16, wherein the separation groove or the reservoir comprises a predetermined bottom geometry.

18. The combination weighing device according to claim 16, further comprising at least one drive unit for driving the reservoir.

19. The combination weighing device according to claim 18, wherein the drive unit is a dust-proof capsuled, drive motor.

20. The separation device of claim 1, further comprising
- a determination means for determining of parameters of the separated product stream; and
- a control means for regulating or controlling a movement, the movement being a rotation movement, of the reservoir, dependent on predetermined parameters or parameters determined with the determination means.

* * * * *